United States Patent
Sato

(10) Patent No.: US 10,001,958 B2
(45) Date of Patent: Jun. 19, 2018

(54) MANAGEMENT APPARATUS, CONTROL METHOD FOR THE MANAGEMENT APPARATUS, AND STORAGE MEDIUM

(71) Applicant: CANON KABUSHIKI KAISHA, Tokyo (JP)

(72) Inventor: Junko Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/232,668

(22) Filed: Aug. 9, 2016

(65) Prior Publication Data

US 2017/0060489 A1    Mar. 2, 2017

(30) Foreign Application Priority Data

Aug. 28, 2015    (JP) ................. 2015-169056

(51) Int. Cl.
| | |
|---|---|
| *H04N 1/00* | (2006.01) |
| *G06F 3/12* | (2006.01) |
| *G06K 15/02* | (2006.01) |

(52) U.S. Cl.
CPC ............ *G06F 3/126* (2013.01); *G06F 3/1217* (2013.01); *G06F 3/1241* (2013.01); *G06F 3/1264* (2013.01); *G06F 3/1285* (2013.01); *H04N 1/00408* (2013.01); *H04N 1/00639* (2013.01); *H04N 1/00641* (2013.01)

(58) Field of Classification Search
None
See application file for complete search history.

(56) References Cited

U.S. PATENT DOCUMENTS

| | | | | |
|---|---|---|---|---|
| 7,864,346 | B2* | 1/2011 | Ryan ................ | G06Q 10/06 358/1.12 |
| 2002/0042798 | A1* | 4/2002 | Takei ................ | G06F 3/1207 715/274 |
| 2005/0141006 | A1* | 6/2005 | Aiyama ............ | G06K 15/007 358/1.13 |
| 2006/0238786 | A1* | 10/2006 | Sakura ............. | G06F 3/1205 358/1.9 |
| 2006/0238793 | A1* | 10/2006 | Akashi ............. | G06F 3/1204 358/1.13 |
| 2006/0239708 | A1* | 10/2006 | Kozuka ............ | G03G 15/5016 399/75 |
| 2007/0133047 | A1* | 6/2007 | Matsueda ......... | G06F 3/1217 358/1.15 |
| 2008/0309964 | A1* | 12/2008 | Willis .............. | H04N 1/00954 358/1.15 |
| 2009/0087242 | A1* | 4/2009 | Sato ................. | G03G 15/6538 399/407 |

(Continued)

FOREIGN PATENT DOCUMENTS

JP    2004-58306 A    2/2004

*Primary Examiner* — Beniyam Menberu

(74) *Attorney, Agent, or Firm* — Canon USA, Inc. I.P. Division

(57) ABSTRACT

Sorting criteria for separating a printing job and a post-processing job included in an input job ticket are registered in a management apparatus that communicates with a specific device. With this configuration, the printing job of an input job ticket is analyzed on a basis of the registered sorting criteria, and separation into the printing job that should be processed by a printing device and the post-processing job that should be processed by a post-processing device is performed.

6 Claims, 17 Drawing Sheets

(56) References Cited

U.S. PATENT DOCUMENTS

| | | | |
|---|---|---|---|
| 2009/0219571 A1* | 9/2009 | Saito | G06F 3/1204 358/1.15 |
| 2009/0279139 A1* | 11/2009 | Miyata | G06F 3/1214 358/1.15 |
| 2010/0091311 A1* | 4/2010 | Sato | B65H 31/24 358/1.12 |
| 2013/0050758 A1* | 2/2013 | Kanai | G03G 15/6541 358/1.15 |
| 2013/0242346 A1* | 9/2013 | Nakamichi | G06F 3/1215 358/1.15 |
| 2014/0064882 A1* | 3/2014 | Sato | B42C 11/04 412/19 |

* cited by examiner

FIG. 4A

Settings for Entire Document

| Paper Settings | Finishing | Quality |

Output Size: SRA3

Output Paper Orientation: ● Portrait  ○ Landscape

Finishing Size: A4

Finishing Orientation: ● Portrait  ○ Landscape

Imposition Layout: 2×2

Imposition Method: Repeat

☐ Printer's Marks/Bleed   [Detailed Settings]

[OK]  [Cancel]

Settings for Entire Document

| Paper Settings | Finishing | Quality |

Print Style: ○ 1-sided Printing
● 2-sided Printing

Booklet Style: [Saddle Stitch ▼]

Binding Location: [Left Binding ▼]

Set Booklet Gutter: [0 ▲▼] mm

☐ Creep (Displacement) Correction

Saddle Stitch Method: ○ All Pages at Once
● Divide into Sets
[25 ▲▼] Sheets

Finisher: [Fold & Staple (Saddle Stitch) ▼]

[ OK ] [ Cancel ]

FIG. 6A

Job Management Application

JobList

| JobNo | JobName | BookletType | JobType | Parts | Page | Copy | Device | Status |
|---|---|---|---|---|---|---|---|---|
| ● | | | | | | | ▶ | |
| ○ | | | | | | | ▶ | |
| ○ | | | - | | | | ▶ | |
| ○ | | - | | - | - | | ▶ | |
| ○ | | | | | | | ▶ | |
| ○ | | - | | | | | ▶ | |
| ○ | | | | | | | ▶ | |
| ○ | | | | - | - | | ▶ | |
| ○ | | | | | | | ▶ | |
| ○ | | | | | | | ▶ | |
| ○ | | | | | | | ▶ | |

[Setting] — 606
[Submit] — 602
[Close] — 603

600 — (window)
601 — (header row)
604 — (row marker)
605 — (selected row)

FIG. 6B

| JobNo | JobName | BookletType | JobType | Parts | Page | Copy | Device | | Status |
|---|---|---|---|---|---|---|---|---|---|
| 0000001101 | Manual-A | Saddle | Print | Cover | 1 | 30 | Printer1 | ▶ | Ready |
| 0000001101 | Manual-A | Saddle | Print | Body | 25 | 30 | Printer1 | ▶ | Ready |
| 0000001101 | Manual-A | Saddle | Finishing | – | – | 30 | SaddleFinisher-2 | ▶ | Ready |
| 0000001102 | UserGuide | – | Print | Cover | 1 | 20 | Printer2 | ▶ | Ready |
| 0000001102 | UserGuide | – | Print | Body | 37 | 20 | Printer2 | ▶ | Ready |
| 0000001103 | SeminarManual | Bind | Print | Cover | 2 | 15 | Printer3 | ▶ | Ready |
| 0000001103 | SeminarManual | Bind | Print | Body | 55 | 15 | Printer3 | ▶ | Ready |
| 0000001103 | SeminarManual | Bind | Finishing | – | – | 15 | Printer3 (Finisher) | ▶ | Ready |
| 0000001104 | Flier – B | – | Print | Body | 2 | 100 | Printer1 | ▶ | Ready |
| 0000001105 | Document C | Saddle | Print | Body | 25 | 50 | Printer2 | ▶ | Ready |
| 0000001105 | Document C | Saddle | Finishing | – | – | 50 | SaddleFinisher-1 | ▶ | Ready |

FIG. 7B

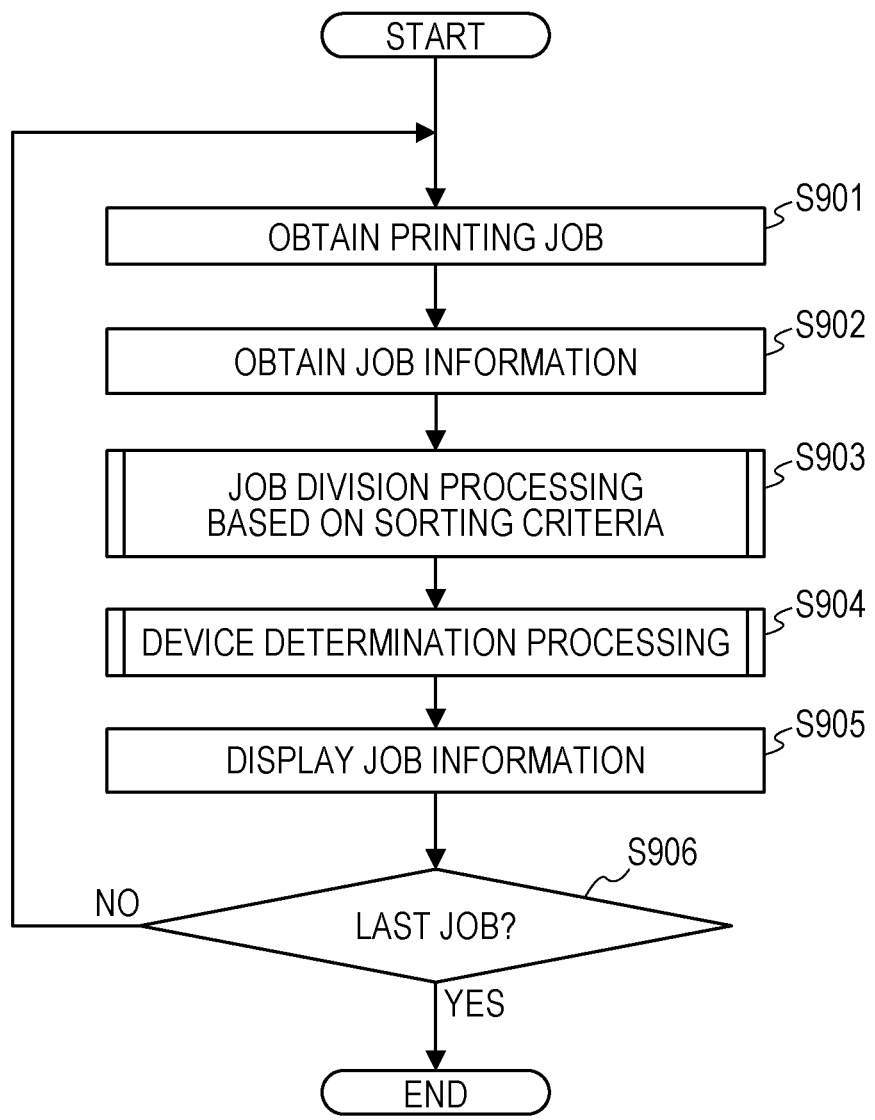

MANAGEMENT APPARATUS, CONTROL METHOD FOR THE MANAGEMENT APPARATUS, AND STORAGE MEDIUM

BACKGROUND OF THE INVENTION

Field of the Invention

The present disclosure relates to a management apparatus, a control method for the management apparatus, and a storage medium.

Description of the Related Art

In recent years, along with an increase in a speed and an increase in an image quality of a printing apparatus of an electrophotographic method or a printing apparatus of an inkjet method, a business model called print on demand has emerged to compete against the above-described printing industry. Hereinafter, this print on demand will be abbreviated as POD.

In POD, post-processing such as cutting, creasing, perforation, stapling, punching, saddle stitch bookbinding, or case work may be performed in some cases on sheets of output results which are printed by the printer.

In post-process where the post-processing is performed, post-processing apparatuses called finishers, such as a sheet folding machine and a sheet cutting machine, are used, and these machines can be categorized into three types. One of the types is a finisher directly connected to the printing apparatus in which sheets are automatically conveyed, which is called an "inline finisher". Another one is a finisher that is connected in a network but is not directly coupled to an engine of the printing apparatus, which is called a "nearline finisher". The last one is a finisher that is not connected even in a network and does not include an information transmission unit, which is called an "offline finisher".

A technology has been proposed for displaying a print condition setting screen of a print request and selecting a printer that performs printing from among a plurality of printers in accordance with a print setting set on the print condition setting screen (see Japanese Patent Laid-Open No. 2004-58306).

However, according to Japanese Patent Laid-Open No. 2004-58306, aspects related to post-processing apparatuses have not been taken into account at all, and the post-processing apparatuses are not used properly in accordance with, for example, a feature of a job, a running situation of the post-processing apparatus, or the like. Furthermore, jobs are not sorted into a printing job and a post-processing job to be allocated to the respectively appropriate printing apparatuses and post-processing apparatuses.

SUMMARY OF THE INVENTION

The present disclosure has been made to address the above-described circumstances, and the present disclosure is aimed at providing a method with which, in a case where a job ticket, including a printing job and a post-processing job, is analyzed, the respective jobs are separated from each other to be allocated to a printing device and a post-processing device in accordance with a registered sorting criteria so that processing can be performed.

At least one management apparatus to address the above-described circumstances according to an aspect of the present disclosure includes the following configuration.

At least one embodiment of a management apparatus that communicates with a specific device includes a registration unit configured to register sorting criteria for separating a printing job and a post-processing job included in an input job ticket, and a separation unit configured to analyze the printing job of the input job ticket on a basis of the registered sorting criteria and perform separation into the printing job that should be processed by a printing device and the post-processing job that should be processed by a post-processing device.

According to other aspects of the present disclosure, one or more additional management apparatuses, one or more control methods for same and one or more storage mediums are discussed herein. Further features of the present disclosure will become apparent from the following description of exemplary embodiments with reference to the attached drawings.

BRIEF DESCRIPTION OF THE DRAWINGS

FIG. 4A illustrates a UI screen displayed on a display illustrated in FIG. 2.

FIG. 4B illustrates a UI screen displayed on the display illustrated in FIG. 2.

FIGS. 6A and 6B illustrate a UI screen displayed on the display illustrated in FIG. 2.

FIG. 7B illustrates a UI screen displayed on the display illustrated in FIG. 2.

FIG. 9 is a flow chart for describing a control method of a management apparatus.

DESCRIPTION OF THE EMBODIMENTS

Next, exemplary embodiments of the present disclosure will be described with reference to the drawings.

Descriptions on a System

First Exemplary Embodiment

System Configuration

Figure 1:
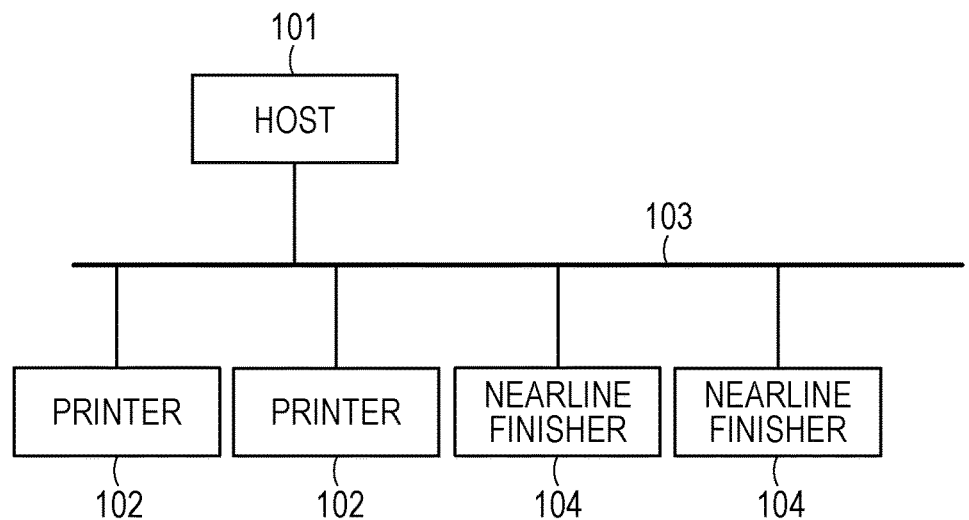
FIG. 1 is a block diagram illustrating a configuration of a printing system.

FIG. 1 is a block diagram illustrating a configuration of an embodiment of a printing system according to the present exemplary embodiment.

FIG. 1 illustrates a situation in which respective apparatuses constituting the printing system are connected to one another via a network 103.

Herein, the respective apparatuses constituting the printing system include a host computer 101 functioning as a management apparatus, printers 102 functioning as information processing apparatuses, and nearline finishers 104. This example illustrates a situation in which the plurality of printers 102 and the plurality of nearline finishers 104 are connected to the network 103. In the printing system according to the exemplary embodiment of the present disclosure, image data is submitted as a printing job from the host computer 101 to at least one of the printers 102 via the network 103, so that an image can be printed by the at least one of the printers 102. In at least one embodiment, the image data may be submitted as a printing job from the host computer 101 to one or all of the printers 102 (e.g., the left or the right printer 102 as shown in FIG. 1) via the network 103, so that an image may be printed by the one or all of the printers 102.

The post-processing job is submitted from the host computer 101 to at least one of the nearline finishers 104, and the output sheet discharged from the at least one of the printers 102 is set in the at least one of the nearline finishers 104. As a result, the post-processing can be performed on the output sheet discharged from the at least one of the printers 102 by the at least one of the nearline finishers 104. In at least one embodiment, the post processing-job is submitted from the host computer 101 to one or all of the nearline finishers 104 (e.g., the left or the right nearline finisher 104 as shown in FIG. 1), and the output sheet discharged from one or all of the printers 102 (e.g., the left or the right printer 102 as shown in FIG. 1) is set in the one or all of the nearline finishers 104.

Figure 2:
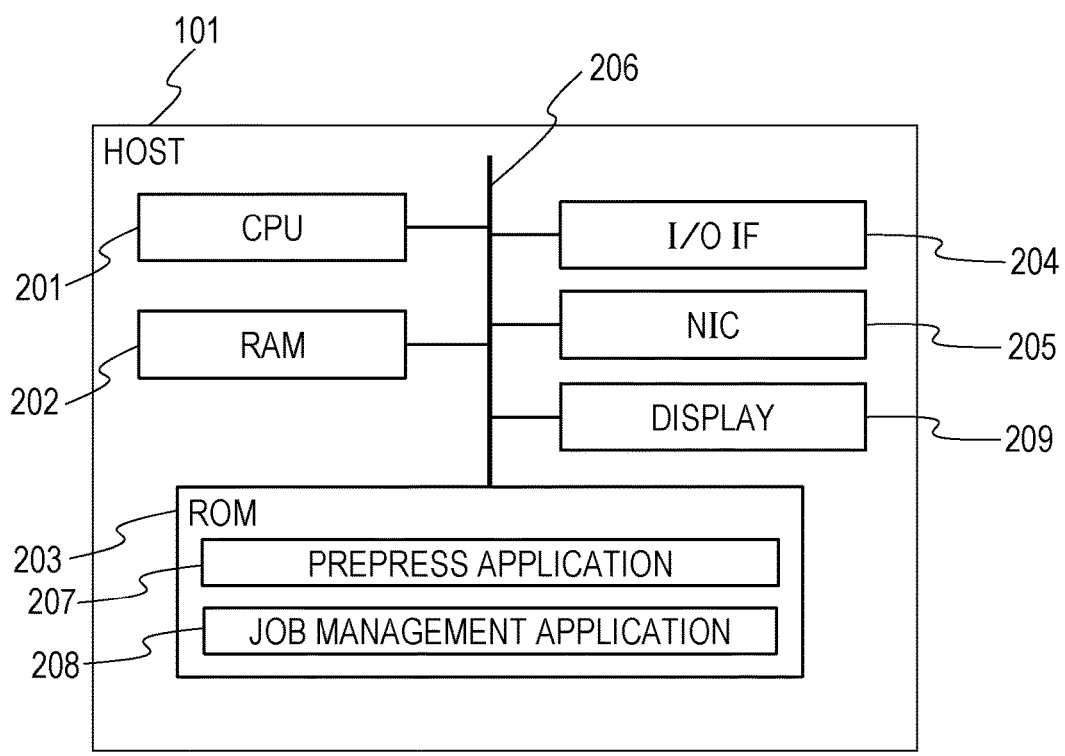
FIG. 2 is a block diagram illustrating a hardware configuration of a host computer.

FIG. 2 is a block diagram illustrating a hardware configuration of the host computer 101 illustrated in FIG. 1.

In FIG. 2, the host computer 101 is constituted by, or includes, a central processing unit ("CPU") 201, a random-access memory ("RAM") 202, a read only memory ("ROM") 203, an input/output ("I/O") interface ("IF") 204, a network interface controller ("NIC") 205, and a bus 206. The CPU 201 executes an operating system (OS) loaded to a program ROM in the ROM 203, a general application, a program, or the like, and the CPU 201 also controls the respective devices connected to the bus 206 in an overall manner.

The ROM 203 also stores an operation system program corresponding to a control program of the CPU 201, an application for creating a document file, and various pieces of data. Furthermore, the ROM 203 stores a prepress application 207 for creating a printing job in the printing system according to the exemplary embodiment of the present disclosure and submitting the generated printing job to a job management application 208. Furthermore, the ROM 203 manages the printing job submitted from the prepress application 207 and also stores the job management application 208 that submits the printing job to the plurality of printers 102.

The RAM 202 functions as a main memory of the CPU 201, a work area, or the like. The I/O interface 204 controls displaying of a display, a key input from the top of the display, or the like. The NIC 205 is connected to a network and executes communication control processing with another device connected to the network.

According to the present exemplary embodiment, a configuration is adopted in which both the prepress application 207 and the job management application 208 are held in the host computer 101. However, a configuration may be adopted in which the prepress application 207 and the job management application 208 are held in two different host computers.

Figure 3:
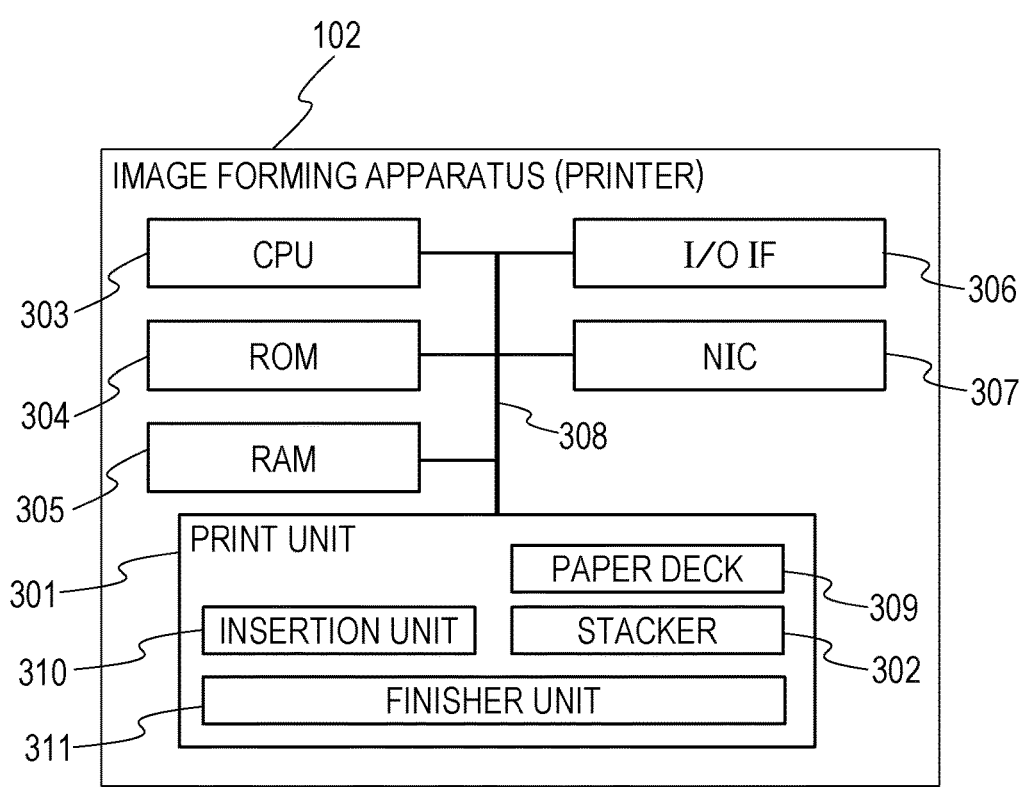
FIG. 3 illustrates an example of a hardware configuration of a printer.

FIG. 3 illustrates an example of a hardware configuration of the printer 102 illustrated in FIG. 1.

In FIG. 3, the printer 102 is provided with a print unit 301, a CPU 303, a ROM 304, a RAM 305, an I/O interface 306, an NIC 307, and a bus 308. Furthermore, the printer 102 is constituted by, or includes, a paper deck 309, a finisher unit 311, a stacker (sheet discharging unit) 302, an insertion unit 310, and the like.

The printer 102 is controlled by the CPU 303 and outputs an image signal as output information to the print unit (printer engine) 301 connected to the bus 308 on the basis of the control program stored in the program ROM in the ROM 304 or the like. The ROM 304 also stores the control program of the CPU 303, font data used for creating the above-described output information, information used on the host computer, or the like.

The CPU 303 can perform communication processing with the host computer 101 via the I/O interface 306 and notify the host computer 101 of the information in the printer 102 or the like. The RAM 305 functions as a main memory of the CPU 303, a work area, or the like. The print unit 301 is provided with the paper deck 309 for setting a sheet used at the time of the printing and an insertion unit 310 for appropriately inserting a sheet at the time of the printing. Furthermore, the print unit 301 is provided with the finisher unit 311 that performs the post-processing such as stapling, saddle stitch, or case work on the output sheet after the printing and the stacker 302 on which the printed output sheets are stacked. As a result, it is possible to cope with printing and discharge of a large number of sheets.

The stacker 302 of the printer 102 may be directly connected with a belt conveyor attached to the nearline finisher 104 in some cases. In this case, the output sheet discharged from the printer 102 can be set in the nearline finisher 104 without the intermediation of a person.

FIGS. 4A to 4C and FIG. 5 each illustrate examples of a UI screen displayed on a display 209 illustrated in FIG. 2. In the present example, examples of a UI screen of the prepress application 207 according to the present exemplary embodiment will be described with reference to FIGS. 4A to 4C and FIG. 5.

A "Settings for Entire Document" window of FIG. 4A is constituted by, or includes, the respective sheets including the sheet settings (Paper Settings), finishing (Finishing), and printing quality (Quality), and the various print settings for the entire document can be performed.

FIG. 4A illustrates a situation in which a paper setting (Paper Settings) sheet is displayed. In this sheet, mainly, the following settings can be performed as settings for determining a layout of the output sheet. For example, an output sheet size (Output Size), such as SRA3 as shown, and its orientation (e.g., Portrait, Landscape, etc.) and a finishing size (Finishing Size), such as A4 as shown, and its orientation (Orientation) (e.g., Portrait, Landscape, etc.) can be set. Furthermore, settings such as an imposition layout (layout of M pieces in the vertical direction×N pieces in the horizontal direction), an Imposition Method and marks/bleed can be performed.

FIG. 4B illustrates a situation in which a finishing (Finishing) sheet (Settings for Entire Document) is displayed. In this sheet, post-processing settings can be performed with respect to the finisher attached to the printer such as specifications on 1-sided/2-sided printing, binding direction/ spread direction, or spread direction and the post-processing using the finisher attached to the printer (stapling/punching/saddle stitch bookbinding/case work, or the like).

Figure 4C:
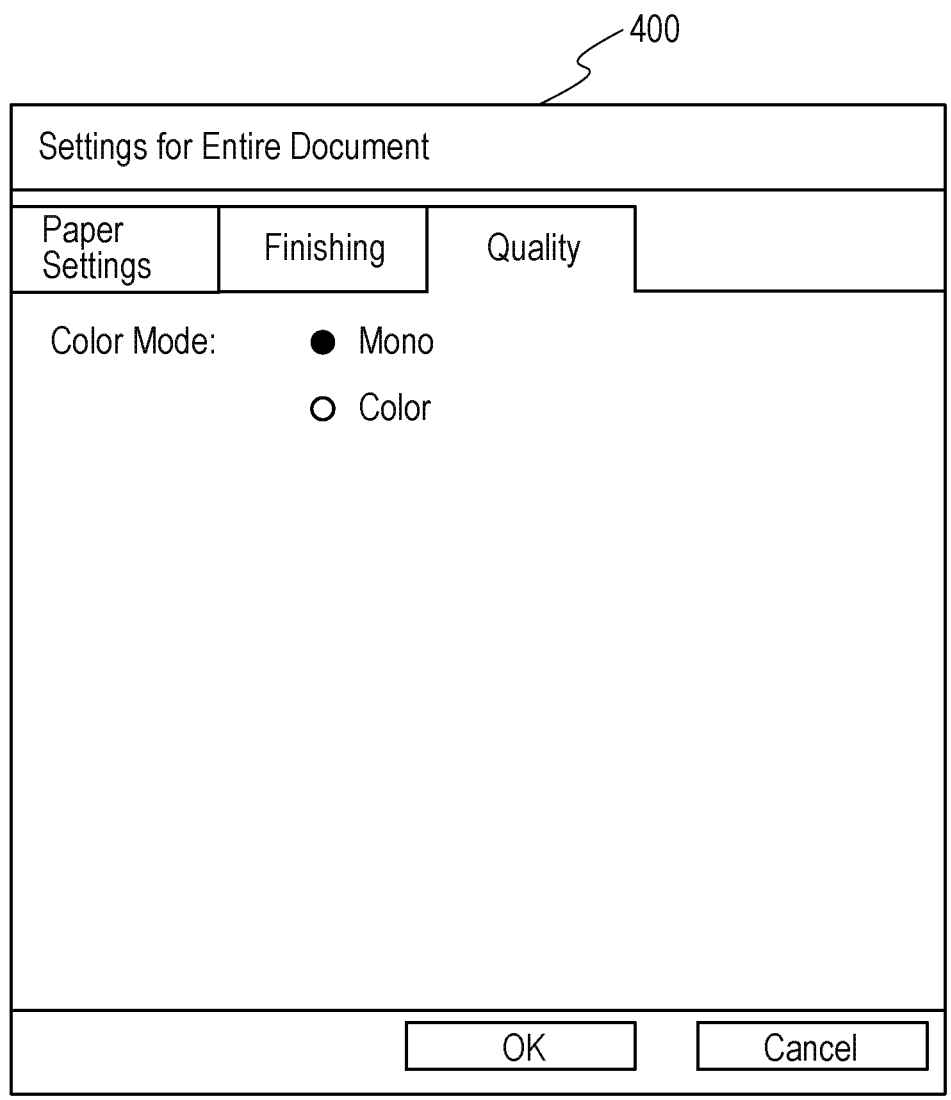
FIG. 4C illustrates a UI screen displayed on the display illustrated in FIG. 2.

FIG. 4C illustrates a situation in which a printing quality (Quality) sheet (Settings for Entire Document) is displayed. In the printing quality sheet, settings related to a color mode with respect to a document (Color Mode) can be performed.

Next, the printing processing of the prepress application 207 of the host computer 101 illustrated in FIG. 1 will be described.

The prepress application 207 according to the present exemplary embodiment can perform a printing instruction to the printer 102 by way of a job ticket of JDF format. Herein, JDF is an abbreviation of Job Definition Format. JDF refers to an industry standard job ticket established by CIP4 that is a collegial organization aimed at integrating processes and processings including plate making, printing, and post-processing in the printing industry to realize an overall business support and an effective business operation.

Figure 5:
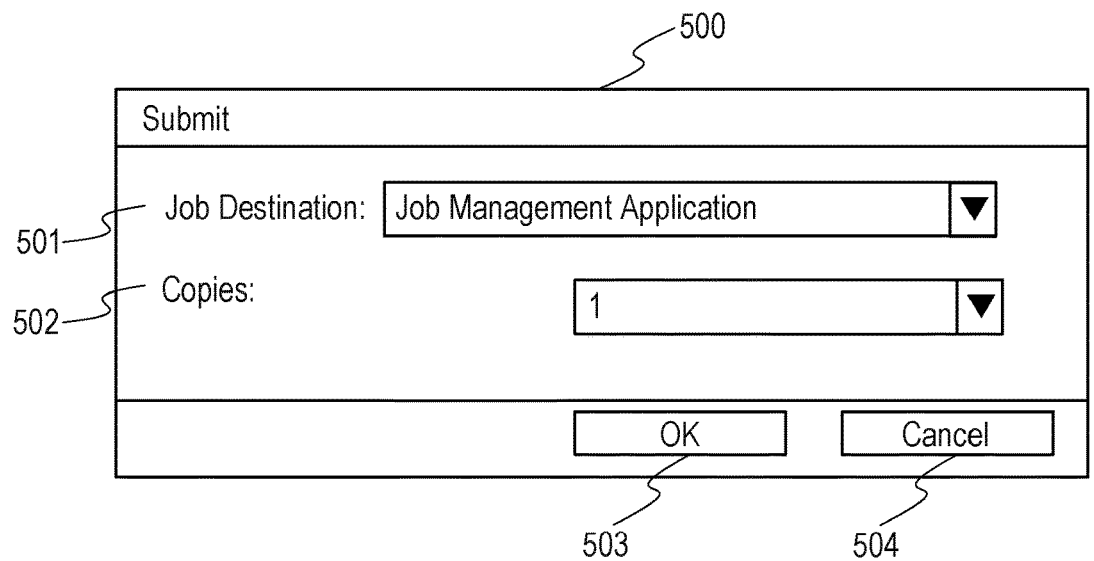
FIG. 5 illustrates a UI screen displayed on the display illustrated in FIG. 2.

FIG. 5 illustrates a UI screen 500 displayed on the display 209 illustrated in FIG. 2. This screen illustrates a UI screen associated with a "job submit (Submit)" window 500 by the prepress application 207 of the printing system.

With this window 500, a user can perform printing execution of the document after the settings are performed on the "Settings for Entire Document" window screen of FIG. 4A.

In FIG. 5, with a "Job Destination" 501, a submit destination of the printing job can be specified. Herein, the printer 102 or the job management application 208 according to the exemplary embodiment of the present disclosure can be specified. A number of copies may also be specified in the Copies field 502. When the user instructs the printing execution by pressing an "OK" button 503, the prepress application 207 generates a JDF corresponding to the job ticket for controlling the image data of the document and the printing processing and the post-processing with respect to the printer. Subsequently, the JDF is submitted to the submit destination specified by the "Job Destination" 501 together with the image data. Alternatively, the user may cancel the Submit feature(s) by clicking the "Cancel" button 504.

Job Management Application According to the Exemplary Embodiment of the Present Disclosure Next, the job management application 208 of the host computer 101 will be described.

The job management application 208 can manage a plurality of printing jobs submitted from the prepress application 207 or the like in an overall manner and submit the job to the specified output device. In addition, at the time of the job input, it is possible to generate a post-processing job including the post-processing instruction from the printing job (including the post-processing instruction) generated in the prepress application 207 on the basis of sorting criteria previously registered in the job management application 208 and execute the submission to the nearline finisher 104.

FIGS. 6A and 6B illustrate a UI screen displayed on the display 209 illustrated in FIG. 2. This screen illustrates a job management screen 600 provided by the job management application 208.

In FIG. 6A, the job management screen 600 is provided with a job list section 601 where the printing jobs and the post-processing jobs managed by the job management application 208 are displayed in a list. Furthermore, the job management screen 600 is provided with a job submit ("Submit") button 602 for executing the submission of the printing job and the post-processing job to the output destination printer or the nearline finisher 104 and a close ("Close") button 603 for closing the screen. Furthermore, the job management screen 600 is provided with a job selection button 604 for selecting a job, an all select button 605 for selecting all the jobs displayed on the job list, and the like. Additionally, the job management screen 600 is provided with a "Setting" button 606 to allow a user to set one or more settings related to the job management application 208.

In FIG. 6B, the post-processing jobs generated by the printing job submitted from the prepress application 207 and the job management application 208 are displayed in the job list section 601. Furthermore, the output destination device, the number of copies, the number of pages included in the printing job, the status of the job, and the like which are set with respect to each of those jobs are displayed in the job list section 601. It should be noted that the user can appropriately change the output destination device setting(s) and the number of copies setting(s) (e.g., via the "Setting" button 606, via a drop down menu icon as shown in FIG. 6B, etc.) in the job list section 601.

Subsequently, the user selects a plurality of jobs in check boxes (e.g., via the job selection buttons 604, the all select button 605, etc.) and presses the job submit ("Submit") button 602, so that it is possible to collectively submit the printing jobs and the post-processing jobs to the specified output destination device.

Figure 7A:
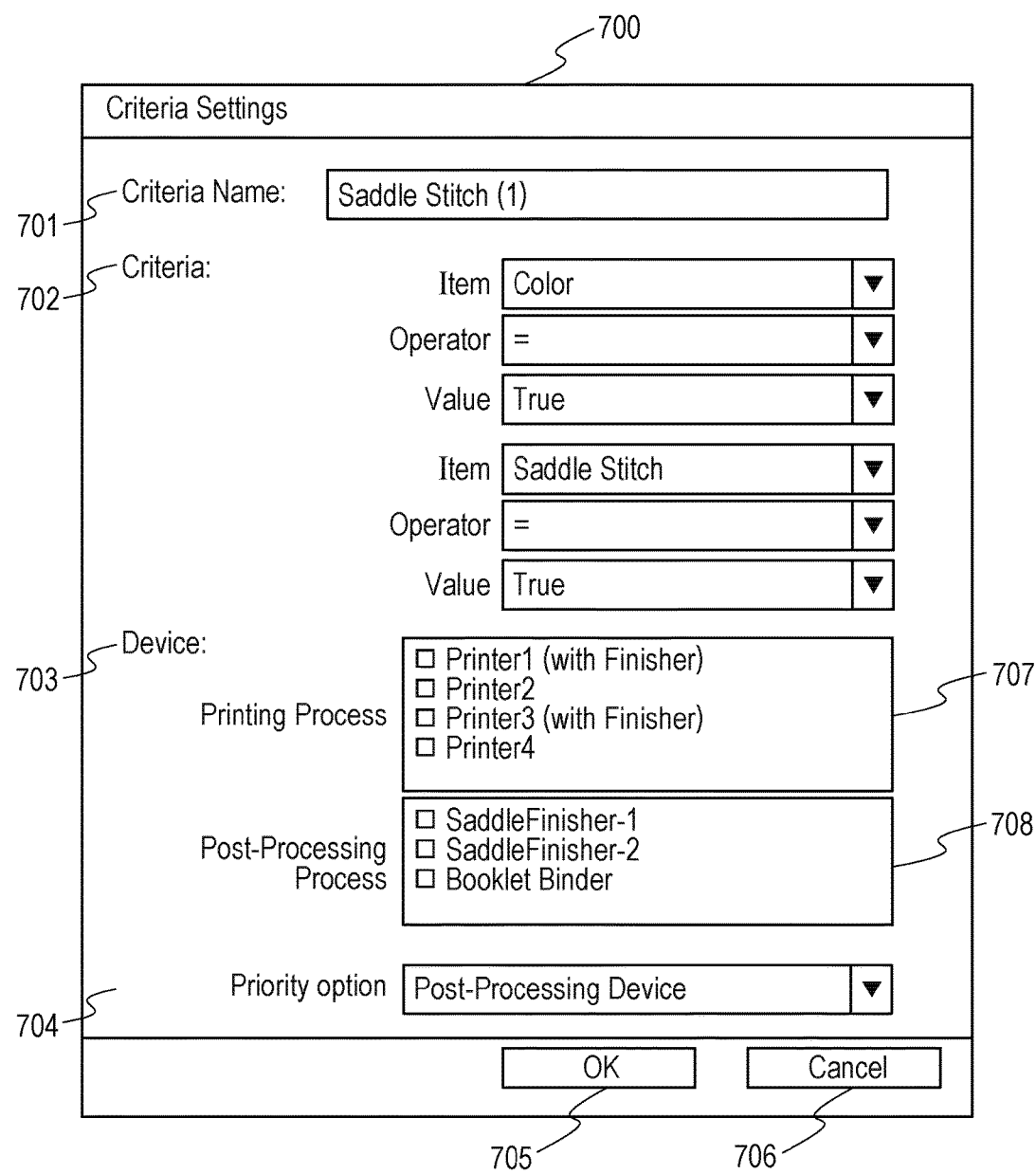
FIG. 7A illustrates a UI screen displayed on the display illustrated in FIG. 2.

FIG. 7A illustrates a UI screen displayed on the display 209 illustrated in FIG. 2. This screen illustrates an example of a sorting criteria setting window ("Criteria Settings") screen 700 for setting sorting criteria provided by the job management application 208 described above. Herein, the user can select and set the printer 102 that performs the printing processing on the job including one or more print settings corresponding to the criteria and the print settings relevant to the criteria and the nearline finisher 104 that performs the post-processing from the displayed device information.

As a result, when the new printing job is input from the prepress application 207, the printer 102 that performs the printing processing and the nearline finisher 104 that performs the post-processing can be automatically allocated on the job management application 208 side on the basis of the sorting criteria.

Furthermore, in a case where a setting for the nearline finisher 104 to perform the post-processing under the registered sorting criteria is made as the print setting included in the job ticket of the newly input printing job, the post-processing job including only the post-processing instruction is generated (separated) from the printing job including the post-processing instruction to be displayed in the job list section 601.

In FIG. 7A, a criteria name 701 is an area for specifying a newly created criteria name (Criteria Name). An area corresponding to criteria (Criteria) 702 is an area for specifying one or more print settings as the sorting criteria. A color or monochrome property, the presence or absence of a saddle stitch setting, the presence or absence of a case work setting, and also a setting on whether or not the number of pages is 15 or higher and the like can be set as the criteria, for example. A device (Device) 703 is an area for specifying the printer 102 that performs the printing processing of the job relevant to the sorting criteria and the nearline finisher 104 that performs the post-processing.

Herein, two or more printers 102 that perform the printing processing and two or more nearline finishers 104 that perform the post-processing can also be respectively set. In a priority option 704, in a case where two or more printers 102 that perform the printing processing and two or more nearline finishers 104 that perform the post-processing are respectively set, it is possible to specify which device is to be determined with priority. A printing process may be set via area 707, and a post-processing process may be set via area 708. The user may then either submit the Criteria Settings by clicking on the "OK" button 705 or may cancel the settings via "Cancel" button 706.

Figure 8A:
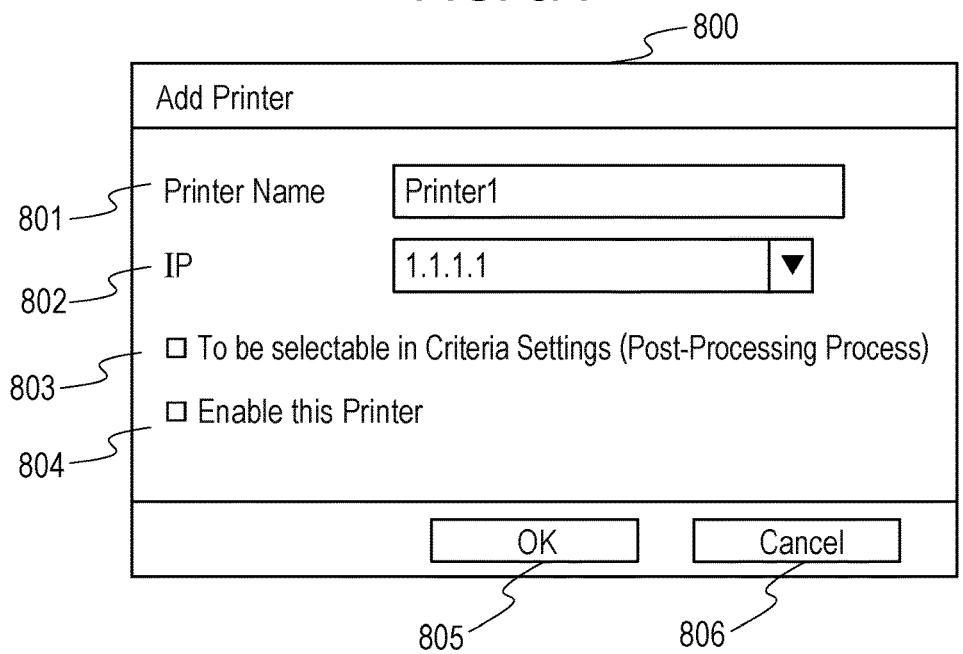
FIGS. 8A and 8B each illustrate a UI screen displayed on the display illustrated in FIG. 2.
Figure 8B:
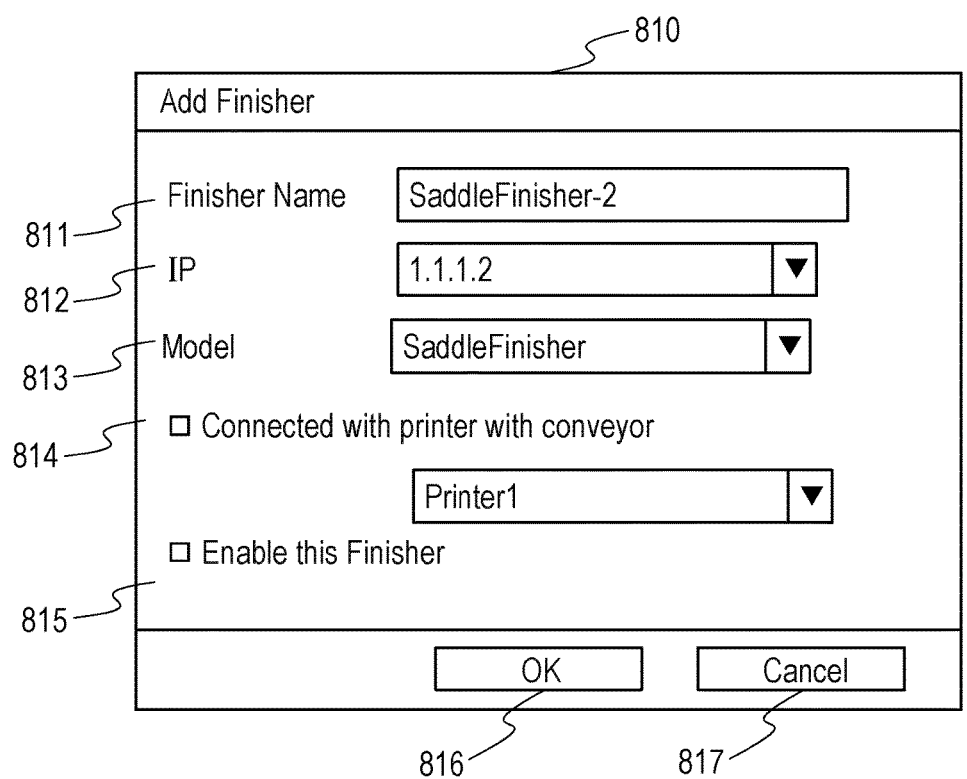

FIGS. 8A and 8B each illustrate a UI screen displayed on the display 209 illustrated in FIG. 2. The screens illustrate an example of a window screen for registering the printer 102 provided (see FIG. 8A) and the nearline finisher 104 (see FIG. 8B) by the job management application 208 with respect to the job management application 208.

Herein, the user can register one or more each of the printers 102 and the nearline finishers 104 desired to be the job submit destinations from the job management application 208.

In this printer addition screen 800 of the printer 102 (FIG. 8A) and a finisher addition screen 810 (FIG. 8B), the registered printers 102 and finishers 104 are displayed on the job management screen 600. As a result, the selection can also be manually performed by the user. As shown in FIG. 8A, a printer name may be entered via "Printer Name" field 801. An IP address of the printer 102 may be entered via "IP" field 802. A user may designate whether the printer is to be selectable in Criteria Settings (Post-Processing Process) via box 803, and the user may enable the printer 102 via the "Enable this Printer" box 804. The user may enter the settings via the "OK" button 805 or may cancel entry thereof via the "Cancel" button 806. As shown in FIG. 8B, a finisher name may be entered via "Finisher Name" field 811. An IP address of the finisher 104 may be entered via "IP" field 812. A model type of the finisher 104 may be designated via "Model" field 813. A user may designate whether the finisher 104 is connected with a printer 102 using a conveyor, and may designate the printer 102, via the "Connected with printer with conveyor" box and related field 814. The user may enable the finisher 104 via the box 815. The user may enter the settings via the "OK" button 816 or may cancel entry thereof via the "Cancel" button 817.

Here, with reference to a flow chart of FIG. 9, descriptions will be given of a display flow of the printing job and the post-processing job in the job list section 601 when the new printing job is input from the prepress application 207 in the job management application 208.

FIG. 9 is a flow chart for describing the control method of the management apparatus according to the present exemplary embodiment. The present example relates to a display processing example of the printing job and the post-processing job in the job list section 601 when the new printing job is input from the prepress application 207 in the job management application 208. It should be noted that the respective steps are realized while the CPU 201 executes the stored control program.

The user executes the printing from the job submit screen of the prepress application 207 illustrated in FIG. 5, and the job management application 208 obtains the submitted printing job (S901). Then, the job management application 208 obtains job information (for example, the job number, the job name, the number of copies, the number of pages, the print setting information, and the like) from the job ticket (JDF) included in the input printing job (S902).

Subsequently, the flow proceeds to S903, and job division processing based on the sorting criteria (a detail of which will be described below) is performed. Subsequently, in S904, the printer 102 that performs the printing processing of this job and the finisher 104 that performs the post-processing are determined on the basis of the registered sorting criteria. Subsequently, in S905, the information related to this job (information obtained in S902) is displayed in the job list section 601. Subsequently, the flow proceeds to S906, and it is determined whether or not the job is the last job. The above-described processing is repeated until it is determined in S906 that the job is the last job, and the display processing of the job list section is ended.

Figure 10:
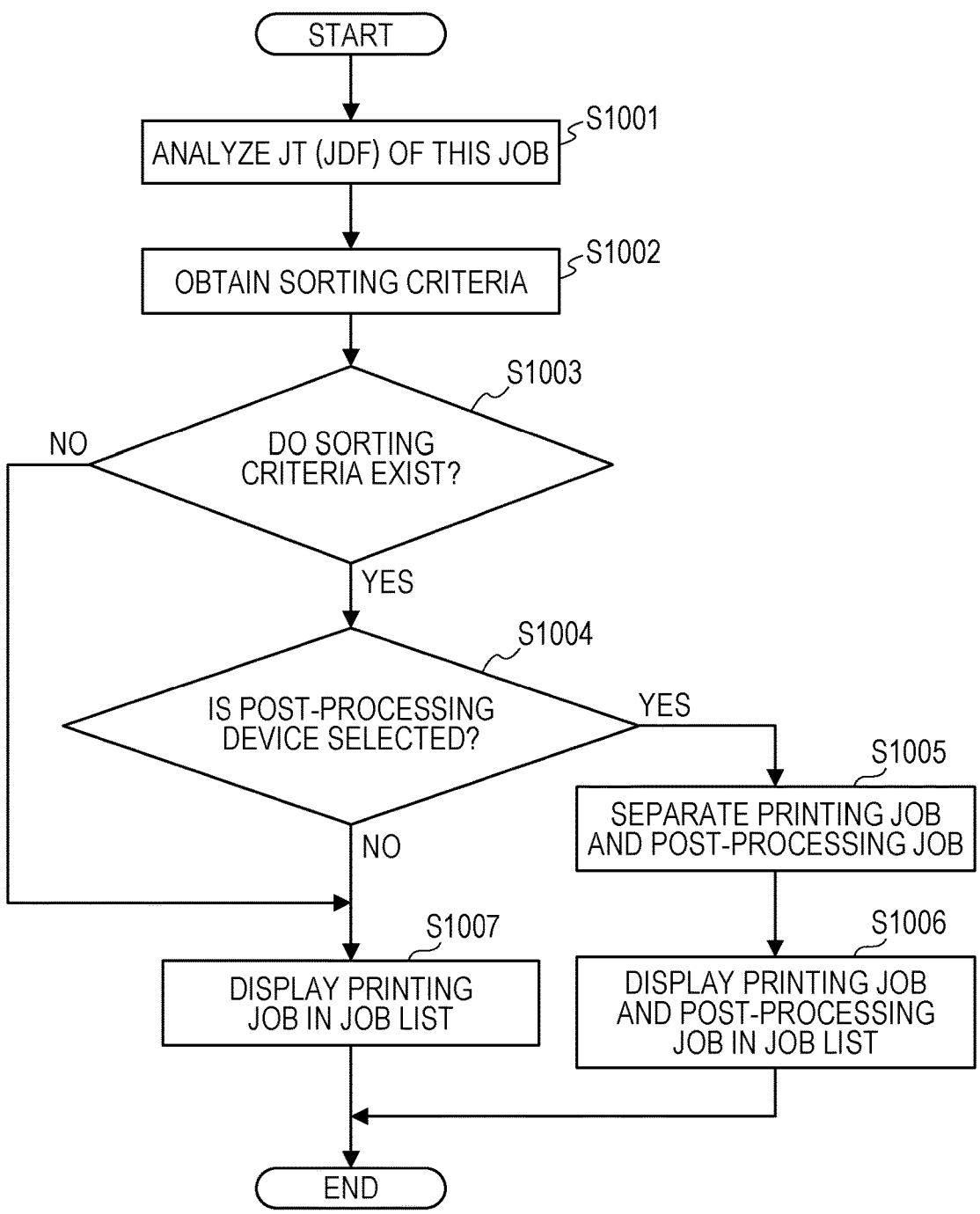
FIG. 10 is a flow chart for describing the control method of the management apparatus.

FIG. 10 is a flow chart for describing the control method of the management apparatus according to the present exemplary embodiment. The present example relates to a detailed process of the job division processing flow based on the sorting criteria described with reference to S903 illustrated in FIG. 9. It should be noted that the respective steps are realized while the CPU 201 executes the stored control program.

In S1001, first, the job information of this printing job obtained from the prepress application 207 is analyzed. Subsequently, the flow proceeds to S1002 to obtain the sorting criteria related to the print setting of this job. Subsequently, the job management application 208 determines whether or not the obtained sorting criteria are registered and/or exist (S1003). At this time, when the job management application 208 determines that the sorting criteria exist, the flow proceeds to S1004, and the job management application 208 determines whether or not one or more post-processing devices are selected in the sorting criteria.

At this time, when the job management application 208 determines that one or more post-processing devices are selected, the flow proceeds to S1005. Subsequently, the printing job (including the post-processing instruction) received from the prepress application 207 is separated into the printing job corresponding to the printing instruction and the post-processing job including only the post-processing instruction. Subsequently, the separated printing job and post-processing job are displayed in the job list section 601 (S1006), and the processing is ended.

On the other hand, in S1003, in a case where the job management application 208 determines that the sorting criteria do not exist, the flow proceeds to S1007. Similarly, in S1004, in a case where the job management application 208 determines that none of the one or more post-processing devices is selected in the sorting criteria, the flow proceeds to S1007. Subsequently, the printing job is displayed in the job list section 601, and the processing is ended. It should be noted that, in S1006 and S1007, in a case where the printing job received from the prepress application 207 is constituted from a plurality of different parts of the printing job, control is performed such that all of the parts are displayed in the job list section 601. For example, the above-described case corresponds to a case where the printing job is constituted from a front cover job and a main body job.

Figure 11:
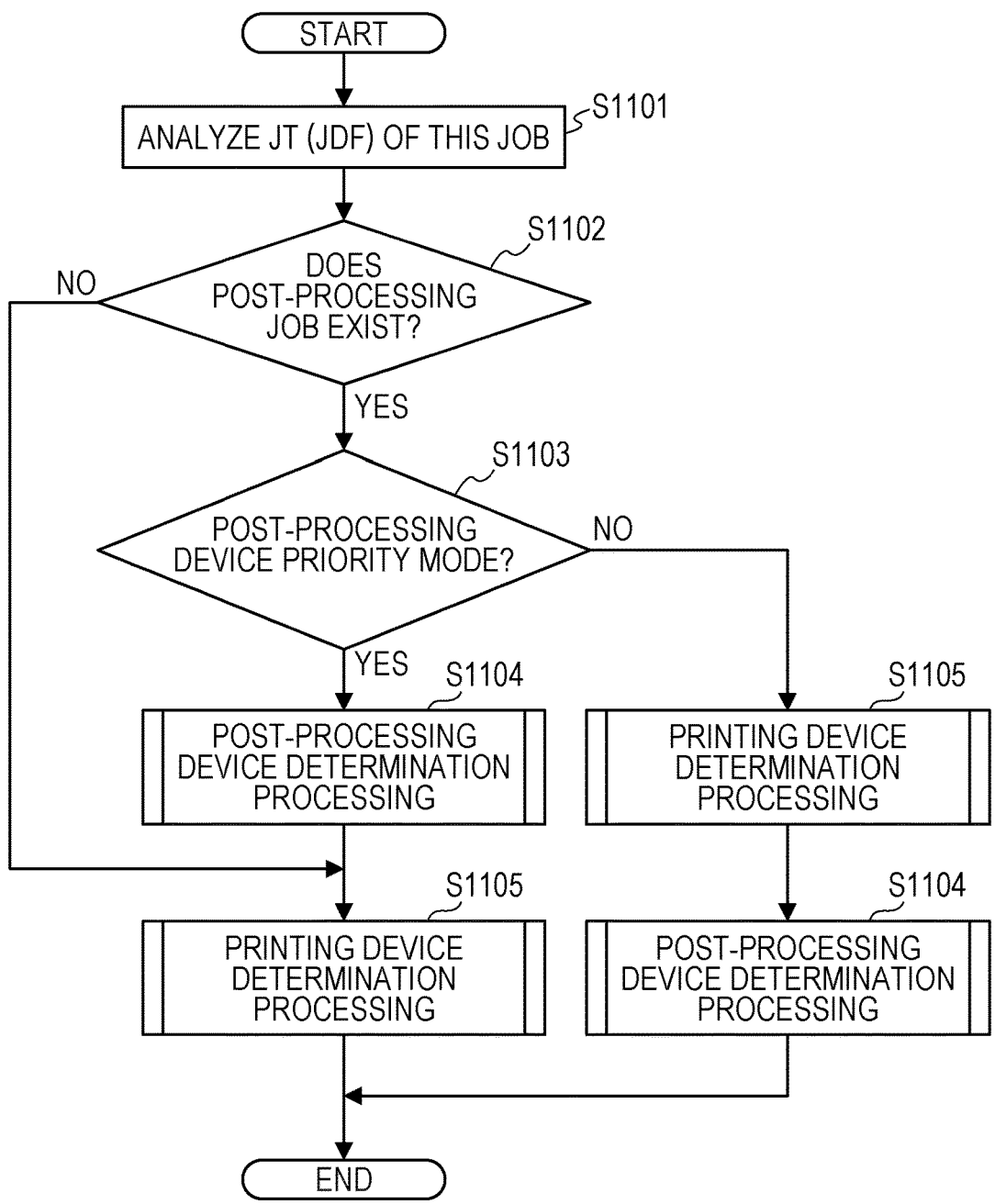
FIG. 11 is a flow chart for describing the control method of the management apparatus.

FIG. 11 is a flow chart for describing the control method of the management apparatus according to the present exemplary embodiment. The present example relates to a detailed process of the device determination processing flow in the job management application 208 described with reference to S904 illustrated in FIG. 9. It should be noted that the respective steps are realized while the CPU 201 executes the stored control program.

In S1101, first, the job management application 208 analyzes the job information of this printing job. Subsequently, the flow proceeds to S1102, and the job management application 208 determines whether or not the post-processing job exists in this job. In a case where the post-processing job exists, the flow proceeds to S1103, and the job management application 208 determines whether or not the priority of the post-processing device is selected as the priority option on a sorting criteria setting screen 700.

At this time, in a case where the job management application 208 determines that the priority of the post-processing device is set, the flow proceeds to S1104, and the job management application 208 performs post-processing device determination processing. Subsequently, in S1105, the job management application 208 performs printing processing device determination processing, and the present processing is ended.

On the other hand, in S1103, in a case where the job management application 208 determines that the priority of the post-processing device is not set (that is, the priority of the printing device is set), the flow proceeds to S1105. Subsequently, the job management application 208 performs the printing processing device determination processing (S1105). Subsequently, in S1104, the job management application 208 performs the post-processing device determination processing. In S1102, in a case where the job management application 208 determines that the post-processing job does not exist in this job, the flow proceeds to S1105. The job management application 208 performs the printing processing device determination processing, and the processing is ended as it is.

Second Exemplary Embodiment

Hereinafter, descriptions will be given of an exemplary embodiment in which an extension can be made such that the job management application 208 of the printing system can select not only the nearline finisher 104 but also the inline finisher of the printer 102 as the devices that perform the post-processing on the sorting criteria setting screen of FIGS. 7A and 7B.

The following check box is checked on a printer addition screen (Add Printer) 800 of FIG. 8A when the new printer 102 is registered by the user. Specifically, for at least one embodiment, it is assumed that a setting "selection can be made as the post-processing device in the sorting criteria setting" or "To be selectable in Criteria Settings (Post-Processing Process)" is made in a check box 803. As a result, the inline finisher of the newly registered printer 102 can be selected as the sorting destination of the post-processing on the sorting criteria setting screen of FIGS. 7A and 7B.

As a result, one or more of the inline finishers attached to the printer and the nearline finishers 104 can be individually selected as the post-processing devices without a distinction. FIG. 7B illustrates an example of the display of the sorting criteria setting screen 700 in a case where Printer1 and Printer3 are registered by the user on the printer addition screen 800. Specifically, the above-described case corresponds to a case where the setting "selection can be made as the post-processing device in the sorting criteria setting" or "To be selectable in Criteria Settings (Post-Processing Process)" is made in the check box 803.

The printer addition screen 800 is different from the sorting criteria setting screen 700 illustrated in FIG. 7A, and it may be understood that not only the nearline finisher 104 but also Printer1 and Printer3 can be selected as the post-processing devices.

Figure 7B:
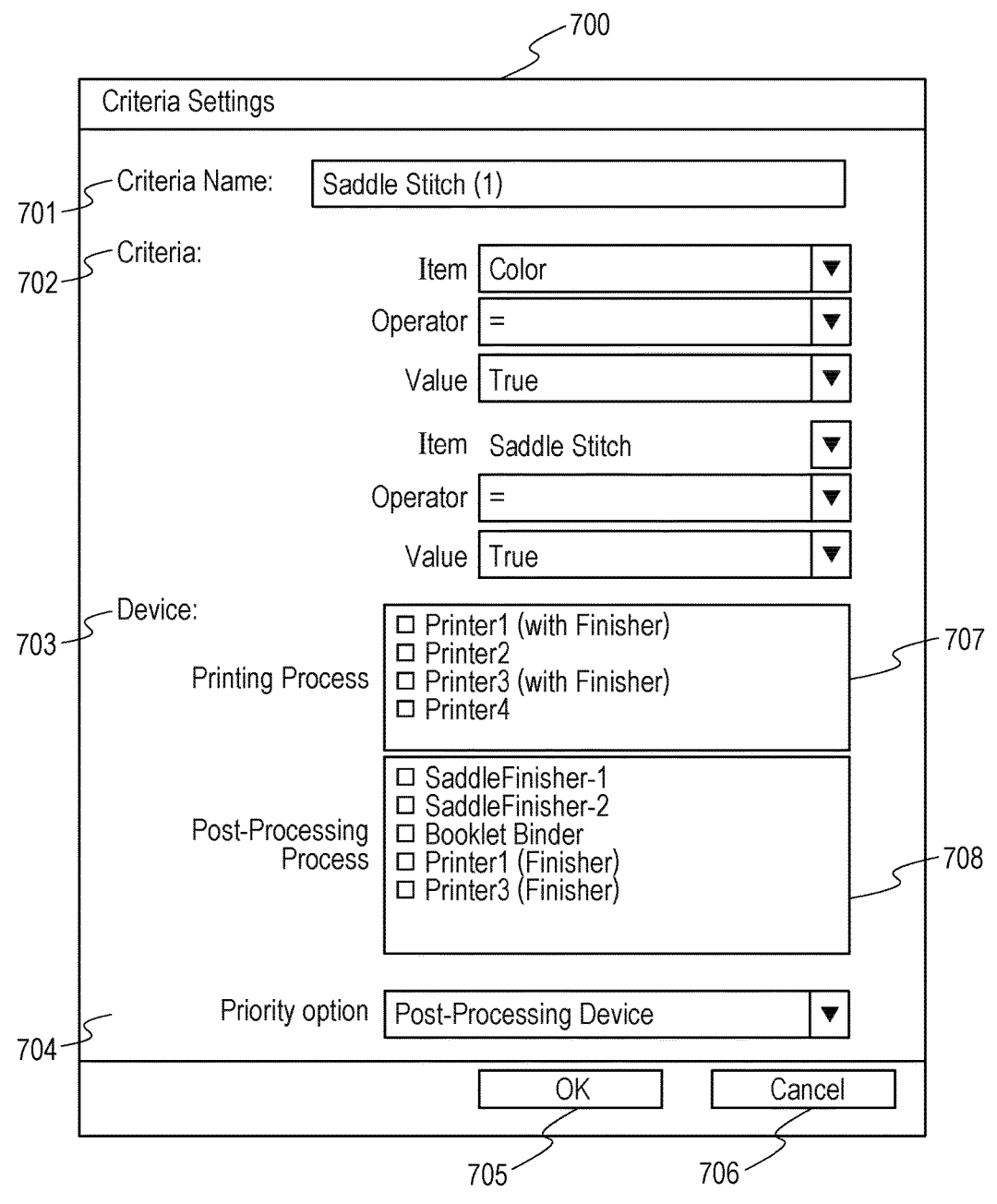

It should be noted that it is assumed that the user selects Printer1 as the post-processing device on the sorting criteria setting screen 700 of FIG. 7B. In this case, the job management application 208 performs control such that Printer1 is automatically selected also as the sorting destination of the printing processing.

As a result, even when the inline finisher of Printer1 is erroneously selected in the post-processing, a mistake of erroneously selecting another printer other than Printer1 can be avoided in the printing processing.

Figure 12:
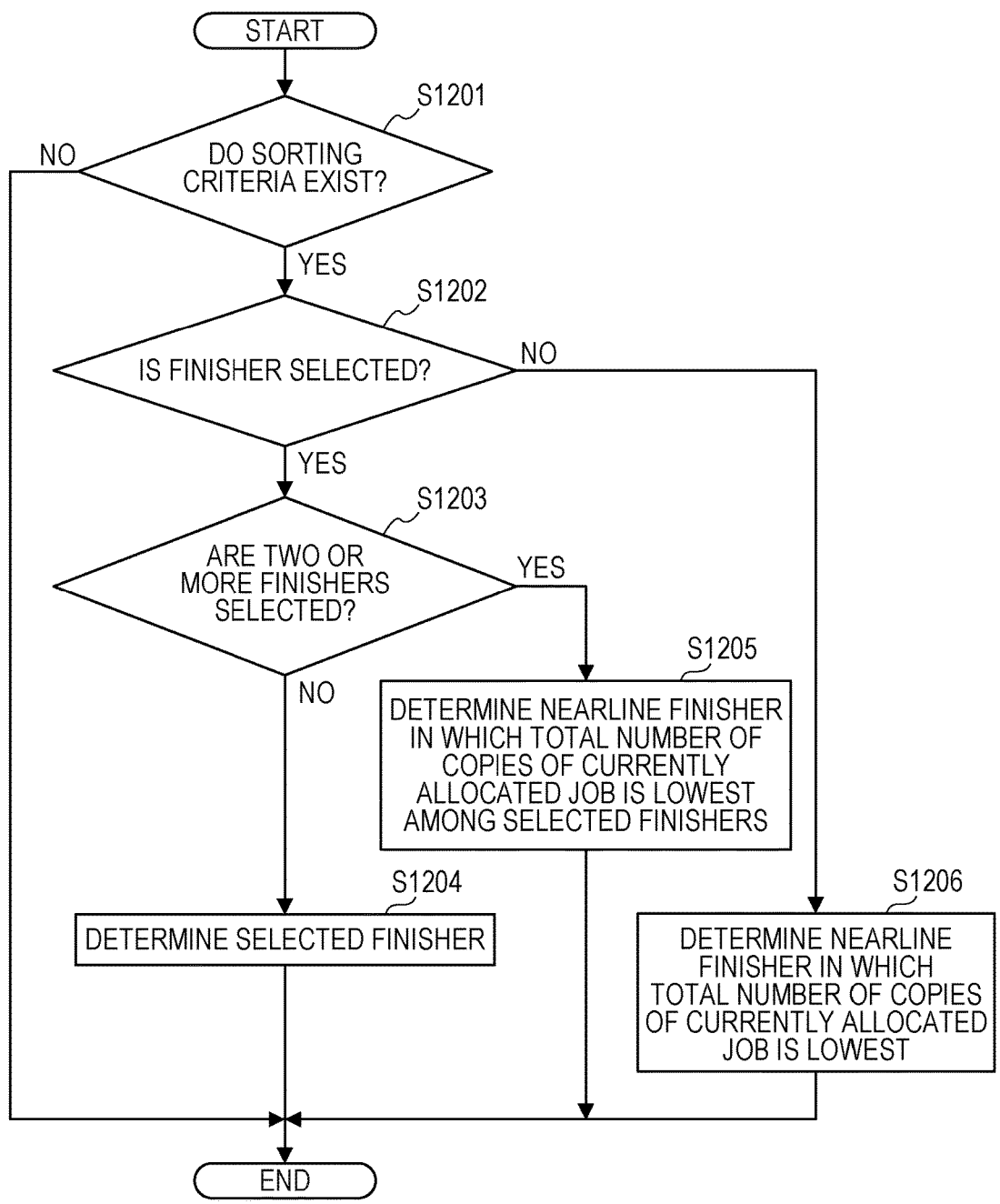
FIG. 12 is a flow chart for describing the control method of the management apparatus.

FIG. 12 is a flow chart for describing the control method of the management apparatus according to the present exemplary embodiment. The present example relates to the post-processing device determination processing process in S1104 of FIG. 11. It should be noted that the respective steps are realized while the CPU 201 executes the stored control program.

First, the post-processing device determination processing flow corresponding to the detail of S1104 will be described with reference to FIG. 12.

In S1201, first, the job management application 208 determines whether or not the sorting criteria related to the print setting of this job are registered and/or exist. At this time, when the job management application 208 determines that the sorting criteria exist, the flow proceeds to S1202. Subsequently, the job management application 208 determines whether or not one or more post-processing devices or finishers are selected as the post-processing devices in the sorting criteria (S1202).

At this time, when the job management application 208 determines that one or more post-processing devices or finishers are selected, the flow proceeds to S1203, and it is determined whether or not two or more post-processing devices or finishers are selected in the sorting criteria. At this time, when the job management application 208 determines that only one post-processing device or finisher is selected, the flow proceeds to S1204, and the selected post-processing device or finisher is determined.

On the other hand, in S1203, in a case where the job management application 208 determines that two or more post-processing devices or finishers are selected, the flow proceeds to S1205. Subsequently, the job management application 208 determines the post-processing device or finisher (e.g., a nearline finisher 104) in which the number of currently allocated post-processing jobs (more specifically, the total number of copies obtained by accumulating the number of copies per job) is the lowest among the selected post-processing devices or finishers.

On the other hand, in S1202, in a case where the job management application 208 determines that the post-processing device or finisher is not selected, the flow proceeds to S1206. Subsequently, the job management application 208 determines the post-processing device or finisher (e.g., a nearline finisher 104) in which the number of currently allocated post-processing jobs (more specifically, the total number of copies obtained by accumulating the number of copies per job) is the lowest among the usable registered post-processing devices or finishers, and the processing is ended.

It should be noted that, in S1201, in a case where the sorting criteria do not exist, no operation is performed (while determined that the selection of the post-processing device is not necessary), and the processing is ended.

Figure 13:
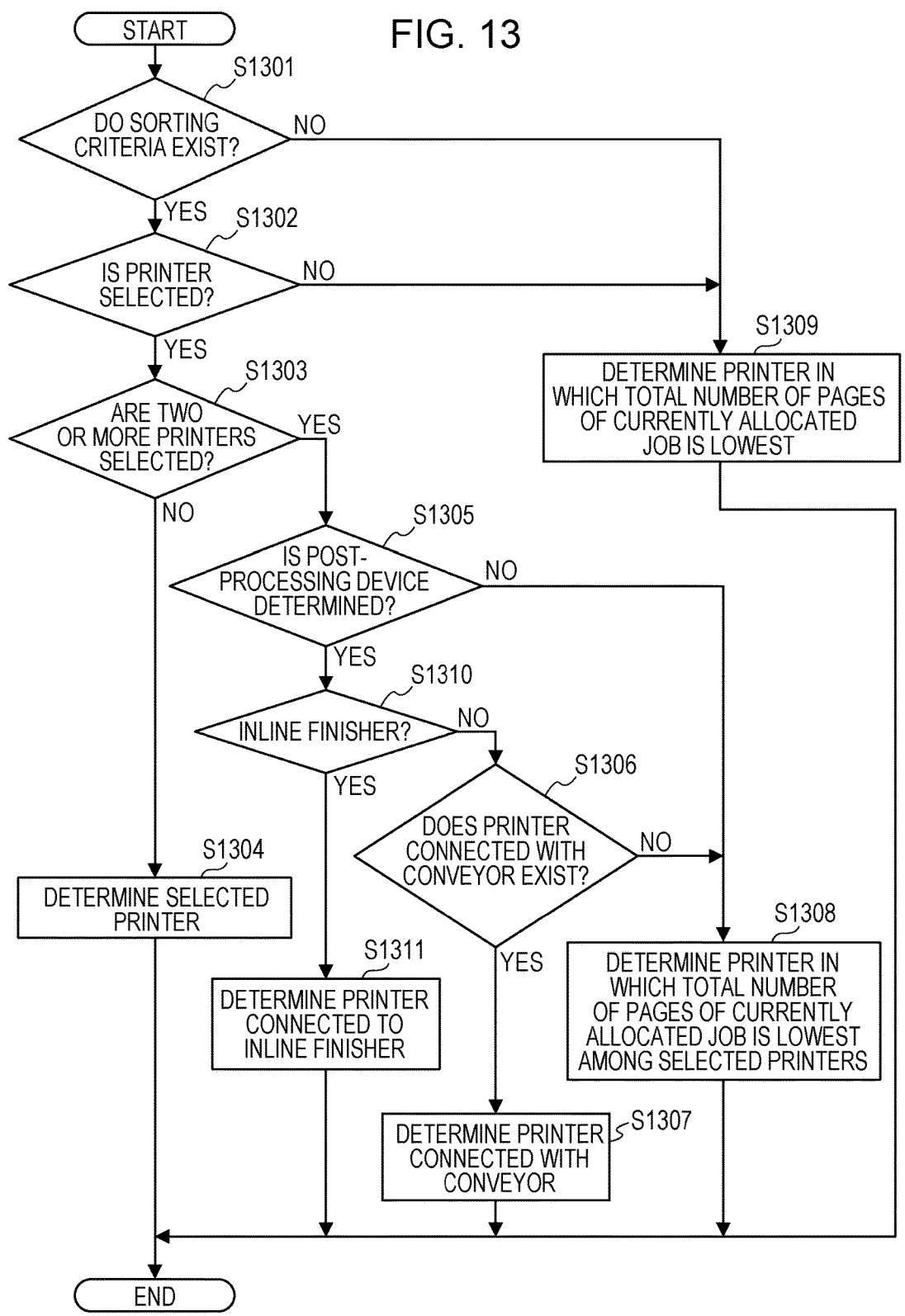
FIG. 13 is a flow chart for describing the control method of the management apparatus.

FIG. 13 is a flow chart for describing the control method of the management apparatus according to the present exemplary embodiment. The present example relates to the printing processing device determination processing process in S1105 of FIG. 11. It should be noted that the respective steps are realized while the CPU 201 executes the stored control program.

In S1301, first, the job management application 208 determines whether or not the sorting criteria related to the print setting of this job exist. At this time, in a case where the job management application 208 determines that the sorting criteria exist, the flow proceeds to S1302, and the job management application 208 determines whether or not the printing processing device (printer) is selected in the sorting criteria. At this time, in a case where the job management application 208 determines that the printing processing device is selected, the flow proceeds to S1303, and the job management application 208 determines whether or not two or more printing processing devices are selected in the sorting criteria.

At this time, when the job management application 208 determines that only one printing processing device is selected, the flow proceeds to S1304, and the selected printing processing device (that is, the printer) is determined.

On the other hand, in S1303, when the job management application 208 determines that two or more printing processing devices are selected, the flow proceeds to S1305 to determine whether or not the post-processing device is already determined. At this time, when the job management application 208 determines that the post-processing device is already determined, it is determined whether or not the post-processing device is the printer (inline finisher) (S1310). When the job management application 208 determines that the post-processing device is the inline finisher, the printer is determined also as the printing processing device.

On the other hand, in S1310, the job management application 208 determines that the post-processing device is not the printer (inline finisher), the flow proceeds to S1306. Subsequently, the job management application 208 determines whether not the printer connected with the conveyor of the selected post-processing device exists in the selected printers (S1306). Specifically, it is determined whether or not the printer set as the printer connected with the conveyor exists on the finisher addition screen 810 of FIG. 8B.

At this time, in a case where the job management application 208 determines that the printer connected with the conveyor of the selected post-processing device and the stacker exists, the printer is determined (S1307).

On the other hand, in a case where the post-processing device is not determined in S1305 or in a case where the job management application 208 determines that the printer connected with the conveyor does not exist in S1306, the flow proceeds to S1308. Subsequently, the job management application 208 determines the printer in which the number of currently allocated printing jobs is the lowest among the selected printing processing devices (that is, the printers) in the sorting criteria. More specifically, the printer in which the total number of pages obtained by accumulating the number of pages per job is the lowest.

On the other hand, in a case where the job management application 208 determines that the sorting criteria do not exist in S1301 or determines that the printing processing device (printer) is not selected in S1302, the flow proceeds to S1309. Subsequently, the job management application 208 determines the printer in which the number of currently allocated printing jobs is the lowest among all the usable printing processing devices (that is, the printers) registered in the job management application 208, and the processing is ended. More specifically, the job management application 208 determines the printer in which the total number of pages obtained by accumulating the number of pages per job is the lowest.

FIG. 6B illustrates an example of a situation after a plurality of jobs are submitted from the prepress application 207 to the job management application.

It may be understood with reference to FIG. 6B that, with regard to the job of "Manual-A", the post-processing job (Finishing job) is newly generated, and "SaddleFinisher-2" is selected as the post-processing device. In the example of "Manual-A", since a bookbinding type (Booklet) is "Saddle (saddle stitch bookbinding)", the post-processing job generated in the job management application 208 includes an instruction of Saddle Stitch (saddle stitch bookbinding).

In addition, with regard to the job of "SeminarManual", the printing job is allocated to "Printer3", and the post-processing job is also allocated to "Printer3 (Finisher)". This means that Printer3 performs the operation from the printing until the post-processing.

The user selects a plurality of jobs from this job list screen by using the job selection button 604 and executes the submission of the job by using the job submit button 602. Then, the printing job of "Manual-A" is submitted to "Printer1", and the post-processing job is submitted to "SaddleFinisher-2".

On the other hand, with regard to "SeminarManual", the post-processing job is also displayed in the job list. However, since "Printer3 (Finisher)" (that is, the inline finisher of the printer) is selected as the post-processing device, the post-processing job is not submitted.

It should be noted that the submit destination of the printing job and the post-processing job can also be manually changed in the job list section 601 on the job management screen 600 of the job management application 208.

It should be noted however that, in a case where the relevant sorting criteria in the respective jobs exist, the printer and the post-processing device which can change the respective jobs are limited to the printer and the post-processing device selected in the sorting criteria. In addition, in a case where the change is made from the nearline finisher to the inline finisher (printer) as the device of the post-processing job, the printer of the printing job of the main body (Body) is automatically changed to the printer of the selected inline finisher.

With this configuration, the job management application 208 may erroneously select the inline finisher of Printer1 as the post-processing. However, the job management application 208 performs the control such that the mistake of erroneously selecting a printer other than Printer1 is avoided in the printing processing.

Figure 14:
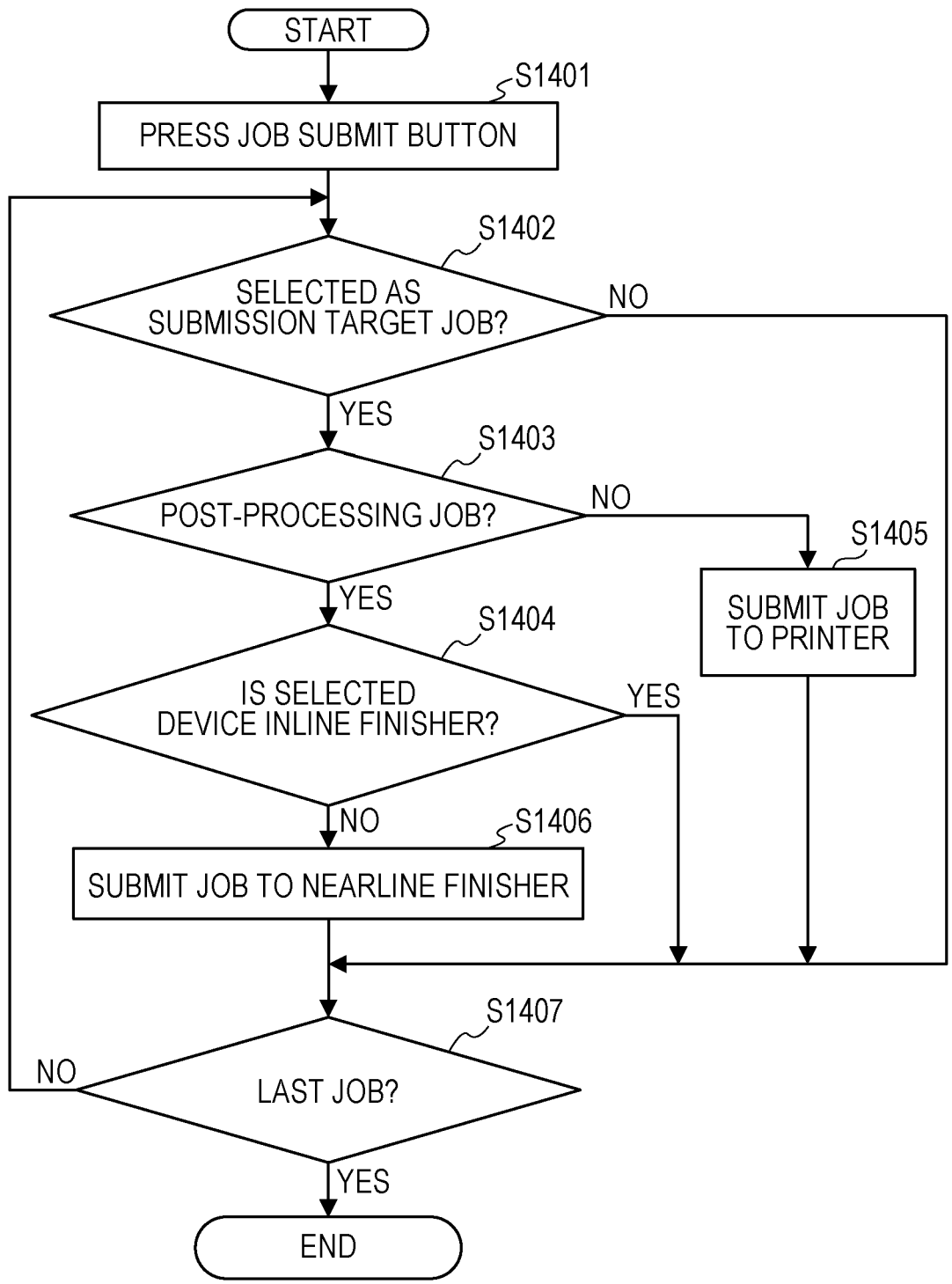
FIG. 14 is a flow chart for describing the control method of the management apparatus.

FIG. 14 is a flow chart for describing the control method of the management apparatus according to the present exemplary embodiment. The present example relates to the job submit processing of the job management application 208. It should be noted that the respective steps are realized while the CPU 201 executes the stored control program.

First, in S1401, the user presses the job submit button 602 on the job management screen 600 of FIGS. 6A and 6B. Then, the job management application 208 proceeds to S1402. Subsequently, with regard to the initial job in the job list section 601, it is determined whether or not the initial job is selected as the submission target job by the job selection button 604 (whether or not the check is ON). At this time, in a case where it is determined that the initial job is selected as the submission target job, the flow proceeds to S1403, and the job management application 208 determines whether or not this job is the post-processing job.

At this time, in a case where the job management application 208 determines that this job is not the post-processing job (that is, the printing job), the flow proceeds to S1405, and this job is submitted to the printer selected as the job submit destination in the job list section 601.

On the other hand, in S1403, in a case where the job management application 208 determines that this job is the post-processing job, the flow proceeds to S1404. Subsequently, the job management application 208 determines whether or not the device selected as the job submit destination in the job list section 601 is the printer (inline finisher). At this time, in a case where the job management application 208 determines that the device is the printer (inline finisher), the job is not submitted (since the post-processing instruction is included in the printing job), and the flow proceeds to S1407.

On the other hand, in S1404, in a case where the job management application 208 determines that the device selected as the job submit destination is not the inline finisher (that is, the nearline finisher), the flow proceeds to S1406. Subsequently, the job management application 208 submits this job to the selected nearline finisher.

Subsequently, in S1407, the job management application 208 determines whether or not this job is the last job in the job list section 601. In a case where the job management application 208 determines that this job is not the last job, the flow returns to S1402, and the similar processing performed on the subsequent jobs.

It should be noted that, when the job management application 208 determines in S1402 that the initial job is not selected as the submission target job (the check is OFF), the flow proceeds to S1407 as it is. The above-described processing is repeatedly performed until it is determined in S1407 that the job is the last job existing in the job list section 601, and the job submit processing.

According to the present exemplary embodiment, in a case where the setting is made such that the post-processing in the print setting is performed in a particular post-processing device on the basis of the information of the job ticket included in the printing job input from the prepress application 207 and the sorting criteria registered in the job management application 208, the job management application 208 of the printing system performs the separation into the printing job corresponding to the printing instruction and the post-processing job including only the post-processing instruction.

Furthermore, the generated printing job and post-processing job can be automatically sorted into the printing processing printer and the post-processing device registered in the job management application, and usability of the user is improved.

According to the present exemplary embodiments, in a case where the job ticket including the printing job and the post-processing job is analyzed, the respective jobs can be separated in accordance with the registered sorting criteria to be processed while being allocated to the printing device and the post-processing device.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-169056, filed Aug. 28, 2015, which is hereby incorporated by reference herein in its entirety.

What is claimed is:

1. An information processing apparatus comprising:
one or more processors; and
a memory storing instructions that, when executed by the one or more processors, cause the apparatus to perform operations comprising:
acquiring jobs that include a printing job and a post-processing job;
displaying, on a display, a selection screen for selecting a device that is to execute the printing job and a device that is to execute the post-processing job;
determining a device that is to execute the printing job and a device that is to execute the post-processing job; and
transmitting the printing job to the device determined as the device that is to execute the printing job and transmitting the post-processing job to the device determined as the device that is to execute the post-processing job,
wherein the selection screen includes, as a candidate for the device that is to execute the printing job, at least a first device capable of executing the printing job and incapable of executing the post-processing job and a second device capable of executing both the printing job and the post-processing job, and includes, as a candidate for the device that is to execute the post-processing job, at least the second device capable of executing both the printing job and the post-processing job and a third device incapable of executing the printing job and capable of executing the post-processing job,
wherein the second device is displayed as the candidate for the device that is to execute the printing job and as the candidate for the device that is to execute the post-processing job,
wherein the device that is to execute the post-processing job is determined based on a device that has been selected via the selection screen, and
wherein in a case where the second device has been selected as the device that is to execute the post-processing job, the second device is automatically determined as the device that is to execute the printing job.

2. The information processing apparatus according to claim 1, wherein the performed operations further comprise displaying, on the display, job information including the printing job and the post-processing job.

3. The information processing apparatus according to claim 1,
wherein the selection screen further operates for setting sorting criteria for job sorting.

4. A control method for an information processing apparatus, the control method comprising:
acquiring jobs that include a printing job and a post-processing job;
displaying, on a display, a selection screen for selecting a device that is to execute the printing job and a device that is to execute the post-processing job;
determining a device that is to execute the printing job and a device that is to execute the post-processing job; and
transmitting the printing job to the device determined as the device that is to execute the printing job and transmitting the post-processing job to the device determined as the device that is to execute the post-processing job,
wherein the selection screen includes, as a candidate for the device that is to execute the printing job, at least a first device capable of executing the printing job and incapable of executing the post-processing job and a second device capable of executing both the printing job and the post-processing job, and includes, as a candidate for the device that is to execute the post-processing job, at least the second device capable of executing both the printing job and the post-processing job and a third device incapable of executing the printing job and capable of executing the post-processing job,
wherein the second device is displayed as the candidate for the device that is to execute the printing job and as the candidate for the device that is to execute the post-processing job,
wherein the device that is to execute the post-processing job is determined based on a device that has been selected via the selection screen, and
wherein in a case where the second device has been selected as the device that is to execute the post-processing job, the second device is automatically determined as the device that is to execute the printing job.

5. The control method according to claim 4,
wherein the selection screen further operates for setting sorting criteria for job sorting.

6. A non-transitory computer-readable storage medium storing a program for causing a computer to execute a method, the method comprising:
acquiring jobs that include a printing job and a post-processing job;
displaying, on a display, a selection screen for selecting a device that is to execute the printing job and a device that is to execute the post-processing job;
determining a device that is to execute the printing job and a device that is to execute the post-processing job; and
transmitting the printing job to the device determined as the device that is to execute the printing job and transmitting the post-processing job to the device determined as the device that is to execute the post-processing job,
wherein the selection screen includes, as a candidate for the device that is to execute the printing job, at least a first device capable of executing the printing job and incapable of executing the post-processing job and a second device capable of executing both the printing job and the post-processing job, and includes, as a candidate for the device that is to execute the post-processing job, at least the second device capable of executing both the printing job and the post-processing job and a third device incapable of executing the printing job and capable of executing the post-processing job,
wherein the second device is displayed as the candidate for the device that is to execute the printing job and as the candidate for the device that is to execute the post-processing job,
wherein the device that is to execute the post-processing job is determined based on a device that has been selected via the selection screen, and
wherein in a case where the second device has been selected as the device that is to execute the post-processing job, the second device is automatically determined as the device that is to execute the printing job.

* * * * *